United States Patent [19]

Yajima et al.

[11] Patent Number: 5,230,912
[45] Date of Patent: Jul. 27, 1993

[54] METHOD OF PREPARING MILK-FERMENTED FOOD

[75] Inventors: Masako Yajima; Shinji Hashimoto; Taketsugu Saita; Kunio Matsuzaki, all of Tokyo, Japan

[73] Assignee: Kabushiki Kaisha Yakult Honsha, Tokyo, Japan

[21] Appl. No.: 617,089

[22] Filed: Nov. 23, 1990

[51] Int. Cl.$^5$ ............................................. A23C 9/12
[52] U.S. Cl. ...................................... 426/43; 426/42; 426/46; 426/61
[58] Field of Search .................. 426/43, 42, 61, 44, 426/656, 634, 46, 62

[56] References Cited

U.S. PATENT DOCUMENTS

| | | | |
|---|---|---|---|
| 4,087,559 | 5/1978 | Mutai et al. | 426/61 |
| 4,091,117 | 5/1978 | Mutai et al. | 426/61 |
| 4,298,619 | 11/1981 | Mutai et al. | 426/61 |
| 4,303,678 | 12/1981 | Ogasa et al. | 426/46 |
| 4,416,905 | 11/1983 | Lundstedt et al. | 426/42 |
| 4,588,595 | 5/1986 | Okonogi et al. | 426/61 |
| 4,913,913 | 4/1990 | Takano et al. | 426/42 |

FOREIGN PATENT DOCUMENTS

| | | |
|---|---|---|
| 154614 | 9/1985 | European Pat. Off. . |
| 1952361 | 4/1971 | Fed. Rep. of Germany . |

OTHER PUBLICATIONS

Journal of Food Science, vol. 45, No. 3, R. H. Schmidt et al., "Heat Treatment and Storage Effects on Texture Characteristics of Milk and Yogurt Systems Fortified with Oilseed Proteins", pp. 471–475, column 25 Table 1; FIGS. 2, 3.

Journal of American Oil Chem. Soc. (1979) vol. 56, No., 3 C. W. Kolar et al. "Vegtable Protein Application of Yoghurt, Coffee Creams and Whip Topping.", pp. 389–391; FIGS. 1, 2.

Food Science & Technology Abstracts, No. 84-0-9-H1793, pp. 325–335; J. Rossi: "Fermented Beverages Obtained from Unconventional Substrates", & Scienza e Technica Lattiero-Caseria 34(5) *Abstract*.

Milchwissenschaft, vol. 44, No. 5, 1989, p. 324; A. A. El-Neshawy et al.: "Qualitat von Zabadi Aus Mit Molkenund Sojaprotein Angereicherter Kumilch" *Abstract*.

Derwent File Supplier WPI/WPIL, AN=77-06532Y [04], Derwent Publications Ltd., London, GB: & JP-A-51 142 566 (Mochizuk I) *Abstract*.

*Primary Examiner*—R. B. Penland
*Attorney, Agent, or Firm*—Oblon, Spivak, McClelland, Maier & Neustadt

[57] ABSTRACT

A method of producing milk-fermented food, wherein a bifidobacteria or a lactic acid bacteria or a combination of these two bacteria are inoculated into and cultured in a culture medium composed mainly of milk, and an isolated soybean protein or a yeast extract or a combination of these substances are added to the culture medium or a culture obtained by cultivation of the bacteria. The bifidobacteria is one or two species selected from *Bifidobacterium breve*, *Bifidobacterium longum*, *Bifidobacterium bifidum*, or *Bifidobacterium infantis*.

7 Claims, 2 Drawing Sheets

METHOD OF PREPARING MILK-FERMENTED FOOD

BACKGROUND OF THE INVENTION

1. Field of the Invention

The present invention relates to a method of producing milk-fermented food, and more particularly, to a method of producing milk-fermented food by fermenting milk with bifidobacterium and/or lactic acid bacteria, and also to milk-fermented food containing bifidobacteria and/or lactic acid bacteria.

"Milk" herein means whole milk or skimmed milk obtained from cows, goats or like animals, or reconstituted milk prepared from powdered milk made from these two kinds of milk, or a mixture of all the kinds of milks mentioned above. "Fermented food" includes beverages such as lactic acid bacteria beverages and those beverages processed by heating and sterilization after fermentation. "Acidity" means volume(ml) of 0.1 N-NaOH per ml to neutralize 10 ml of sample.

2. Description of the Prior Art

Bifidobacterium is one of the most dominant bacterial flora in the intestine of infants and most healthy adults and seems to contribute to the maintenance of a normal flora of intestine. It has been reported that the administration of these live bacteria to human or domestic animals suffering from diarrhea or patients infected with superinfection remarkably improves their symptom. Accordingly, yogurt, milk beverages and sweets which contain live Bifidobacteria have been developed and also have been commercially available in order to improve people in their own health by allowing regular ingestion of such bifidobacteria.

Bifidobacterium is, however, originally anaerobic and thus readily affected by oxygen and easily destroyed in a milk-fermented product having high acidity. Lactic acid bacteria has a tendency to die out, but not so readily as bifidobacterium when pH falls during fermentation.

In milk-fermented food products, It is necessary to maintain the numbers of viable cell at a high level at least for two or more weeks, however, bifidobacteria and lactic acid bacteria will die out because of the decrease in pH caused by their own generation of organic acids. Such qualities limit their acidity to a low level in the milk-fermented food obtained by use of the bacteria. Also, it is difficult to maintain high levels of viable cell count of the product for long period even at moderately suppressed acidic condition. Therefore, a more improved taste cannot be pursued by decreasing the pH of the food. High numbers of viable cells are also difficult to maintain for long periods when the acidity is suppressed in milk-fermented food.

In addition, bifidobacteria requires some growth promoters to obtain sufficient growth in pure milk-medium. Conventionally, there have been growth promoters such as yeast extract, sulphur content amino acids (for example, cystein, methionine and the like ), soybean peptide (refer to Monthly Food Chemical, 8, 64, 1988) and so on. In many cases these substances cannot be used in sufficient amounts because of their own characteristic taste.

The growth accelerating effect of soybean milk is disclosed in Japanese Patent Publication Nos. 45-9822, 51-14256 and 55-89390, however, soybean milk has its own peculiar smell and thus changes for the worse in taste are unavoidable when sufficient amounts of soybean milk are used.

A method is disclosed in Japanese Patent Publication No. 59-179064, wherein soybean milk was neutralized by calcium hydroxide in the presence of calcium dichloride after the removal of its protein by the addition of phosphoric acid or phosphoric acid salts, and then it was precipitated by heating and desalting, thereby condensing the fraction of growth promoting substance for bifidobacteria contained in the soybean milk. The fraction of the growth promoting substance for bifidobacterium thus obtained was composed of 7.2% of crude protein, 77.3% of carbohydrate and 15.5% of crude ash, the carbohydrate was composed of 51.9% of sucrose, 27.0% of stachyose and 11.2% of raffinose. It has been also reported that a highly activated growth promoting substance for bifidobacterium was obtained by purifying this fraction with the use of a membrane separation method and, which was made of 12.3% of raffinose, 84.5% of stachyose and 3.2% of verbacose (Japanese Patent Publication No. 60-66978). Japanese Patent Publication No. 62-155082 disclosed a growth promoting substance for bifidobacterium which was directly extracted from defatted soybean meal by using a 20 to 60 w/v % of alcoholic solution. The main component of the accelerator was an oligosaccharide which was composed of 82.5% to 85.1% of carbohydrates, 6.9% to 7.5% of protein, 1.0% to 2.8% of lipid and 6.3% to 6.4% of ash. These bifidobacterium accelerators mainly made up of oligosaccharides are so difficult to digest that they go down to a lower area of the intestines, thereby effectively stimulating the growth of bifidobacterium in an entero carbon source-deficient environment. These oligosaccharides are, however, not so effective for stimulating the growth of bifidobacterium in a culturing process of producing milk-fermented food because of the simultaneous presence of other readily available saccharides, lactose or glucose or so on.

Various efforts have been exerted to shorten the fermenting period when employing a lactic acid bacterium, accordingly, more effective means have been expected to emerge.

SUMMARY OF THE INVENTION

In view of the foregoing, an object of the present invention is to eliminate the above disadvantages in the production of milk-fermented food.

More specifically, the object of the present invention is to provide a better method of producing milk-fermented food, wherein the fermenting period for producing the milk-fermented food which is fermented by bifidobacteria and/or lactic acid bacteria is shortened to increase the numbers of live bacteria in the product, increasing their survival rate and maintaining the numbers thereof for a long period, thereby providing milk-fermented food with fresh flavor based on high acidity.

Another object of the present invention is to provide a milk-fermented food manufactured by the above producing method wherein the survival rate of the bifidobacteria is improved so as to maintain the numbers of viable bacteria.

According to a first aspect of the present invention, there is provided a method of adding an isolated soybean protein to a culture medium composed mainly of milk in a milk-fermented food producing method wherein bifidobacterium or lactic acid bacteria or a combination of these two bacteria are inoculated into and cultured in the culture medium.

According to a second aspect of the present invention, it provides a method of adding an isolated soybean protein and a yeast extract to a culture medium composed mainly of milk in a milk-fermented food producing method wherein bifidobacterium or lactic acid bacteria or a combination of these two bacteria are inoculated into the culture medium and cultured.

According to a third aspect of the present invention, there is provided a method of adding an isolated soybean protein to milk-fermented culture obtained from a cultivation of bifidobacterium or lactic acid bacteria or a combination of these two bacteria in a milk-fermented food producing method wherein such bifidobacteria or lactic acid bacteria or a combination of these two bacteria is inoculated into and cultured in the culture medium composed mainly of milk.

DETAILED DESCRIPTION OF THE INVENTION

Figure 1:
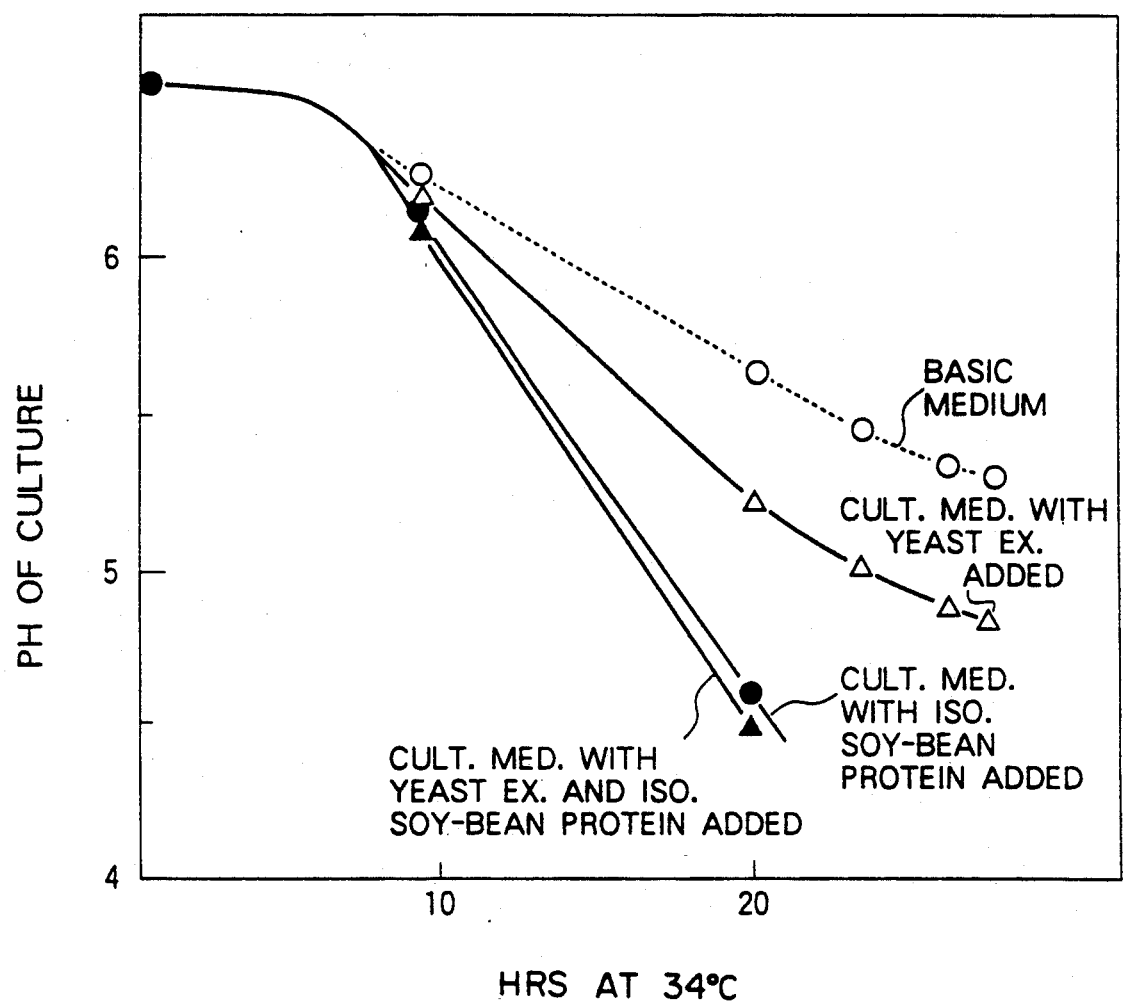
FIG. 1 is an illustration of a graph showing results of Experiment 1.

The present invention is illustrated hereunder in more detail. The method of the present invention can be performed in a conventional way with the species of bacteria, milk culture medium and fermenting conditions, specified according to the kinds of milk-fermented food to be produced, except that bifidobacteria or lactic acid bacteria or a combination of these two bacteria are inoculated into and cultured in the culture medium composed mainly of milk to which was added isolated soybean protein.

The isolated soybean protein in this invention is prepared by the neutralization and drying of soybean protein that was gathered after precipitation of protein from soybean milk by adding an acid to the soybean milk obtained from defatted soybean by extraction with water. Such isolated soybean protein can be used since it is being mass-produced and is commercially available in these days.

The isolated soybean protein can be arbitrarily added to a milk culture medium for culturing the above-mentioned bacteria. It is, however, preferable to dissolve the soybean protein in water together with a culture medium composed mainly of milk, for example, culture medium materials such as powdered milk, and to heat-sterilize the resulting mixture.

The amount of addition of the isolated soybean protein to the culture medium composed mainly milk is preferably approximately 0.1 w/v % to 7.0 w/v %, and more suitably approximately 0.1 w/v % to 5.0 w/v %. If this protein is added to the culture medium in greater amounts, improvements in the growth accelerating effect and survival rate effect are not appreciable, but on the contrary, this will provide products with a characteristic soybean odor in certain kinds of products, so high addition rates of the soybean protein exceeding the above-mentioned range are not very meaningful except when trying to regulate a nutritive balance with the soybean protein.

The growth of the bacteria proceeds remarkably fast and generation of acids is also accelerated by adding the isolated soybean protein, thereby cultivating time in reaching a pre-determined pH is greatly shortened. Furthermore, the generated amount of organic acids such as acetic acid, lactic acid and the like, which are metabolites generated during the growth of bifidobacteria or lactic acid bacteria, increases when the isolated soybean protein is added to the cultured medium. The original acid and base buffering action by the isolated soybean protein itself, however, restrains a decrease in pH so that resultant pH of the culture with isolated soybean protein is not so low but the acidity thereof is higher than culture without isolated soybean protein. Such effect may provide a milk-fermented food with high acidity without decreasing the survival rate of the bacteria used in the fermentation.

Other arbitrary growth accelerators may be usable together with an isolated soybean protein as long as the above-mentioned excellent characteristics of the soybean protein are not spoiled. Specifically, a yeast extract is suitably preferred when added to a medium in small amounts without exerting bad effects on the flavor of food. The growth of the bacteria is highly accelerated when the isolated protein is added to the medium together with the yeast extract. The amount of addition of the yeast extract to the milk culture medium is preferably approximately 0.01 w/v % to 0.1 w/v %.

Further, in the method of the present invention, the isolated soybean protein may be added to the bacterial culture after discontinuing cultivation when acidity of the inoculate reaches a pre-determined level. Protein is added to the same medium during processes such as homogenization, mixing with other milk-fermented substances, and addition of sweetenings, seasonings or spices to the inoculate and dilution of the same according to the kind of final product.

An addition of the isolated soybean protein to the bacterial culture after cultivation can increase the survival rate of bacteria in milk-fermented food fermented with bifidobacterium or lactic acid bacteria, and also can produce products having a fresh tasty flavor.

In such a case, the addition of the isolated soybean protein to the culture is approximately 0.1 w/v % to 1.5 w/v %, and is preferably approximately 0.1 w/v % to 1.0 w/v %. If the isolated soybean protein is added to the culture medium in greater amounts, effects in improving the survival rate of bacteria are not appreciable, but on the contrary, this provides some kinds of products with a characteristic soybean odor.

The product may be packed after processes such as homogenization, mixing with other milk-fermented substances, addition of sweetenings, seasonings or spices, dilution of the inoculate and sterilization by heating according to the kind of final product.

It is apparent from the foregoing that the method disclosed in this invention can shorten the time need to produce milk-fermented food fermented with bifidobacterium or lactic acid bacteria, and also can improve the viable numbers of live bifidobacteria, enabling its survival rate thereof toincrease. Since the bacterial culture with isolated soybean protein has a higher pH level than that of a conventional one with no isolated soybean protein added, at the same acidity, the pH at the completion of cultivation can be set at a high level without worrying about the taste becoming unsavory due to unsufficient acidity, thereby improving the survival rate of bifidobacteria and also providing a tasty milk-fermented food which maintains relatively higher numbers of living bacteria for long period.

The isolated soybean protein employed in the present invention does not have as strong a soybean odor as soybean milk, and the weak soybean odor is sufficiently removed during fermentation. Also it has none of bitter taste peculiar to peptides. Accordingly, sufficient amounts of the soybean protein can be used without fear of adversely effecting taste, thereby creating excellent effects and also contributing to an improvement of the nutritive balance of the milk-fermented food.

EXAMPLES

Methods of the present invention are illustrated with reference to the following examples, but the invention is not intended to be limited only to these following examples.

The isolated soybean protein employed in each example was Fujipro CL made by Fujiseiyu Co., LTD.

Experiment 1

Bifidobacterium breve YIT4010 was inoculated in a milk culture medium (10 w/v % of skim milk powder, 0.03 w/v % of yeast extract) which was prepared anaerobically under flushing nitrogen gas, and cultured at 37° C. overnight. The culture solution thus obtained was specified as a starter.

3.2 w/v % of isolated soybean protein and/or 0.05 w/v % of yeast extract was added to a basic milk culture medium (5 w/v % of whole milk powder, 12 w/v % of skim milk powder). The culture medium thus obtained was inoculated with 1 v/v % of starter and cultured at 34° C. During cultivation, pH in the culture was measured, and the growth of the bifidobacteria was compared with pH as an indication.

The results are illustrated in FIG. 1. Further, none of the culture were found to have any deterioration of flavor.

As will be clear from FIG. 1, the growth rate of bifidobacteria was remarkably promoted by addition of the isolated soybean protein and was further promoted by the simultaneous use of the yeast extract. It is impossible to compare the growth accelerating effect of the isolated soybean protein with that of the yeast extract at the substance level since the adding concentrations of these two solutions are different. However, further yeast extract is added to the culture medium, the flavor thereof is spoiled, and therefore, it is clear that the isolated soybean protein is superior in achievable growth promoting effect without adversely affecting flavor.

Experiment 2

The starters were prepared by using Bifidobacterium breve YIT4010(I), Bifidobacterium bifidum YIT400-7(II), Bifidobacterium bifidum E319(III), Bifidobacterium longum YIT4035(IV) and Bifidobacterium longum ATCC15707(V), respectively in a similar manner as in experiment 1.

The basic culture medium used in this experiment was composed of 13 w/v % of whole milk powder. This basic culture was employed as a control culture. Another culture medium with a growth promoting substance added was prepared by the addition of 0.2 w/v % or 1.0 w/v % of isolated soybean protein and 0.03 w/v % of yeast extract. The culture media thus obtained were inoculated with 2 v/v % of bifidobacteria starters, respectively and were cultured at 37° C. for 16 hours. The growth in the culture media were compared using the pH of culture solution as an indication. The results were illustrated in Table 1.

TABLE 1

| Growth accelerating substance (%) | | pH of culture solution after 16 hours of cultivation at 37° C. | | | | |
|---|---|---|---|---|---|---|
| yeast extract | Isolated soybean protein | Bifidobacterium | | | | |
| | | I | II | III | IV | V |
| 0 | 0 | 5.48 | 5.06 | 5.77 | 6.21 | 5.74 |
| 0.03 | 0 | 4.88 | 4.75 | 5.44 | 6.03 | 5.10 |
| 0 | 0.2 | 5.34 | 4.73 | 5.60 | 6.05 | 5.62 |
| 0.03 | 0.2 | 4.75 | 4.67 | 5.41 | 5.24 | 5.43 |
| 0 | 1.0 | 4.67 | 4.61 | 5.41 | 5.64 | 5.04 |
| 0.03 | 1.0 | 4.36 | 4.57 | 5.27 | 5.01 | 5.08 |

The four out of the five sample strains show more or less similar tendencies, but Bifidobacterium longum ATCC15707(V) has shown a different tendency. Namely, bifidobacteria grew slowly in the basic culture but the growth of bifidobacteria was stimulated when the yeast extract or the isolated soybean protein was added thereto.

When the concentration of the isolated soybean protein was 0.2%, the growth rates of the bifidobacteria were the same or slightly inferior to those rates when the yeast extract alone was added thereto. When the isolated soybean protein concentration was 1%, the growth rate of the bifidobacteria showed better results than in the former case. The growth rates were further stimulated when both the isolated soybean protein and the yeast extract were added to the basic culture medium. Specifically, Bifidobacterium breve YIT4010(I) and Bifidobacterium longum YIT4035(IV) exhibited this tendency. Bifidobacterium longum ATCC15707(V) showed a sharp effect in growth rate when the yeast extract alone was added to the basic medium. Simultaneous addition of the isolated soybean protein to the medium did not stimulate the growth of the bifidobacteria. However, the growth thereof was still stimulated by the addition of the isolated soybean protein alone.

Example 1

Culture media were prepared by adding an isolated soybean protein to a basic culture medium which contained 5 w/v % of whole milk powder and 12 w/v % of skim milk powder. The isolated soybean protein concentration of the medium attained 3.2 w/v % or 4.8 w/v % A control culture medium was prepared by adding 0.03 w/v % of yeast extract to the basic culture medium without adding the isolated soybean protein.

Culture media were inoculated with 1 v/v % of a starter of Bifidobacterium breve YIT4010(B. breve) stock prepared in a similar manner to Experiment 1, and were cultured at 37° C. until the pH of such resulting culture solution attained 4.6.(the yeast extract was added to the control culture medium because bifidobacteria showed a slow growth rate in a culture medium having no growth accelerator, and also could not be fermented to attain a pH of 4.6 for comparing their survival rates at the same pH. The survival rate of bifidobacteria did not change for the worse by the addition of the yeast extract).

3 volumes of the bifidobacterium culture solution thus obtained was mixed with 2.3 volumes of the basic culture medium, 0.55 w/v % of pectin and 0.4 w/v % of gelatin were added to the mixture, and water was added for preparing a total of 10 volumes of yogurt-like milk-fermented food. This product was preserved at 10° C. for 15 days, and the results of the change in the viable cell number of bifidobacteria are shown in Table 2.

TABLE 2

Decrease in viable cell number of B. breve by preservation

| Concentration of Isolated soybean protein in B. breve culture (w/v %) | viable cell number of B. breve Immediately after production | After 15 days | Survival rate (%) |
|---|---|---|---|
| 0 | $9.6 \times 10^8$ | $2.8 \times 10^7$ | 2.9 |
| 3.2 | $2.3 \times 10^9$ | $3.9 \times 10^8$ | 17.0 |
| 4.8 | $2.5 \times 10^9$ | $5.9 \times 10^8$ | 23.6 |

The food contained isolated soybean protein food had entirely no soybean odor when 3.23 w/v % of isolated soybean protein (1 w/v % of concentration in food product) was added, but rather there was an increase in acidic taste and in the feeling of freshness, therefore to excel in flavor. When the isolated soybean protein itself was dissolved in water, it has a soybean odor. However, such odor had been removed during fermentation due to the bifidobacterium. As the concentration of the isolated soybean protein increased, soybean odor had generated gradually, but smelled only slightly even when added with 4.8 w/v % (1.5 w/v % of concentration in the food product).

Example 2

A culture medium was prepared by adding an isolated soybean protein to the basic culture medium which contained 10 w/v % of whole milk powder and 8 w/v % of skim milk powder until the isolated soybean protein concentration of the medium attained to 2.18 w/v %. The basic culture medium was employed as a control culture medium to which an isolated soybean protein was not added. Both culture media were inoculated with 0.5 v/v % of starter of a lactic acid bacterium (Streptococcus thermophilus YIT2021) prepared in a manner similar to Experiment 1, and then were cultivated at 37° C. until the pH of the culture attained 4.55.

It took 23 hours to cultivate the culture medium to which an isolated soybean protein was not added, but took only 14 hours and 45 minutes to complete cultivation in a culture medium to which an isolated soybean protein was added, thereby the cultivation time to ferment could become greatly short. The viable cell number of B.breve in the culture were $1.3 \times 10^9$ CFU/ml when the isolated soybean protein was not added, and were $3.0 \times 10^9$ CFU/ml when the isolated soybean protein was added.

2.3 volumes of the latic acid bacterial culture thus obtained was mixed with pectin and gelatin until 0.55 w/v % and 0.4 w/v % concentrations were attained, respectively in the medium. A yogurt-like milk-fermented food was prepared by adding water to the resulting culture medium until this medium attained a total of 10 volumes.

The transient in the numbers of live bacteria by preservation was examined after this product was preserved at 10° C. for 15 days. There was almost no change in numbers of viable cells.

Example 3

A culture medium was prepared by adding an isolated soybean protein to a basic culture medium which contained 16 w/v % of skimmed milk powder and 0.05 w/v % of yeast extract until the isolated soybean protein concentration of the medium attained 0.1 w/v % or 0.2 w/v %. A basic culture medium to which the isolated soybean protein was not added, was employed as a control medium. Both culture media were inoculated with 2 v/v % of a starter of Bifidobacterium breve YIT4010 prepared in a similar manner to Experiment 1, and then were cultivated at 34° C. until the pH of the culture attained 4.55.

The above-mentioned basic culture medium was inoculated with 0.5 v/v % of starter of Streptococcus thermophilus YIT2021 prepared in a similar manner to Experiment 1, and was cultured at 34° C. until the pH of the culture solution attained 4.40.

1.5 volumes of a bifidobacterium culture solution obtained by the above-mentioned cultivation was mixed with 1.5 volumes of a lactic acid bacteria culture solution, pectin was added to the mixture until the pectin concentration attained 0.3 w/v %, and then sucrose solution was added until the concentration of sucrose attained 6.0 w/v %. Lactic fermenting beverage was prepared by adding water to the resulting solution until the total amount of food product attained 10 volumes.

The flavor of the product was good irrespective of the addition of the isolated soybean protein to the product. The result of preservation test at 10° C. is illustrated in Table 3.

TABLE 3

Decrease in numbers of live bacteria by preservation

| Concentration of Isolated soybean protein in B. breve culture (w/v %) | Viable cell number of B. breve Immediately after production | After 15 days | Survival rate (%) |
|---|---|---|---|
| 0 | $5.2 \times 10^8$ | $2.3 \times 10^7$ | 4.4 |
| 0.1 | $7.9 \times 10^8$ | $5.3 \times 10^7$ | 6.7 |
| 0.2 | $7.9 \times 10^8$ | $6.2 \times 10^7$ | 7.9 |

Example 4

A culture medium was prepared by adding an isolated soybean protein to a basic culture medium which contained 13 w/v % of whole milk powder and 0.03 w/v % of yeast extract until the soybean protein concentration of the medium attained 0.5 w/v %. Said culture medium was inoculated with 2 v/v % of a starter of Bifidobacterium longum ATCC15707 stock prepared in a similar manner to Experiment 1, and then was cultivated at 34° C. until the pH of the cultivation solution attained 4.65.

The culture medium which contained 7.5 w/v % of whole milk powder, 21 w/v % of skim milk and 0.1 w/v % of yeast extract was inoculated with 0.5 v/v % of starter of Streptococcus thermophilus prepared in a similar manner to Experiment 1, and was cultured at 37° C. until the pH of the culture solution attained 4.50.

1.5 volumes of a bifidobacterium culture solution obtained by the above-mentioned cultivation was mixed with 3.0 volumes of a latic acid bacteria culture solution, pectin was added to the mixture until the pectin concentration attained 0.3 w/v %, and then sucrose solution was added until the degree of sweetness attained 60. A yogurt was prepared by adding water to the resulting solution until the total amount of food product attained 10 volumes.

The resultant yogurt had entirely no soybean odor and had a fresh tasty flavor.

Example 5

A culture medium was prepared by adding an isolated soybean protein to a basic culture medium which contained 13 w/v % of whole milk powder and 0.03 w/v % of yeast extract until the soybean protein concentration of the medium attained 0.5 w/v %. Said culture medium was inoculated with 2 v/v % of a starter of Bifidobacterium infantis ATCC15697 stock prepared in a similar manner to Experiment 1, and then was cultivated at 34° C. until the pH of the cultivation solution attained 4.65.

On the other hand, the cultured product was obtained by culturing Streptococcus thermophilus in a manner similar to Example 4.

1.5 volumes of a bifidobacterium culture solution obtained by the above-mentioned cultivation was mixed with 3.0 volumes of a lactic acid bacteria culture solution, pectin was added to the mixture until the pectin concentration attained 0.3 w/v %, and then sucrose solution was added until the degree of sweetness attained 60. A yogurt was prepared by adding water to the resulting solution until the total amount of food product attained 10 volumes.

The resultant yogurt had entirely no soybean odor and had a fresh tasty flavor.

Experiments 3 to 6

An isolated soybean protein was added to a basic culture medium which contained 13 w/v % of whole milk powder and 0.03 w/v % of yeast extract until the concentration of the isolated soybean protein attained 3.2 w/v %. This medium was cultured with 1 v/v % of a starter of Bifidobacterium breve prepared in a manner similar to Experiment 1, and then was cultured at 34° C. until the pH of the culture solution attained 4.65. Next, 0.5 v/v % of a starter of Streptococcus thermophilus prepared in a similar manner to Experiment 1 was inoculated into a culture medium which contained 7.5 w/v % of whole milk powder, 21 w/v % of skim milk powder and 0.1 w/v % of yeast extract, and then was cultured at 37° C. until the pH of the culture solution attained 4.50.

1.5 volumes of the Bifidobacterium breve culture solution thus obtained, was mixed with 3 volumes of Streptococuss thermophilus culture solution. A yogurt was prepared by adding pectin and syrup and water to the mixture until the total volume of the mixture attained 10 volumes (Experiment 3).

Another yogurt was prepared in a similar manner as described above except that an isolated soybean protein was not added to the Bifidobacterium breve culture medium (Experiment 4).

Furthermore, a yogurt was prepared in a manner similar to Experiment 3 except that Streptococcus thermophilus was cultivated until the pH of the culture solution attained 4.35. (Experiment 5). In addition, a yogurt was prepared in a manner similar to Experiment 4 except that Streptococuss thermophilus was cultivated until the pH of the culture solution attained 4.35 (Experiment 6).

Table 4. shows characteristic values and a sensory evaluation of each product. On account of the use of the isolated soybean protein, we could produce a yogurt having both higher acidity and a higher pH value, thereby producing a yogurt having sourness, or suitable acidity without being dim.

TABLE 4

|  | pH | Acidity | Sensory evaluation |
| --- | --- | --- | --- |
| Experiment 3 | 4.46 | 8.85 | Fresh and clean tasting |
| Experiment 4 | 4.47 | 8.04 | No punch and weak |

TABLE 4-continued

|  | pH | Acidity | Sensory evaluation |
| --- | --- | --- | --- |
| Experiment 5 | 4.35 | 9.67 | Delicious, but sour |
| Experiment 6 | 4.34 | 8.95 | Ordinary taste |

Examples 6 to 8 and Comparative Examples 1 to 3

1 v/v % of a starter of Bifidobacterium breve YIT4010 prepared in a manner similar to Experiment 1 was inoculated into a milk culture medium (13 w/v % of skim milk powder and 0.03% w/v % of yeast extract), and then was cultured at 37° C. until pH of the culture medium attained 4.65.

After sterilization of a culture medium, which was composed of 7.5 w/v % of whole milk powder and 21 w/v % of skim milk powder, the medium was inoculated with a lactic acid bacteria (Streptococcus thermophilus), and then was cultivated at 37° C. until the pH of the culture medium attained 4.35.

An isolated soybean protein to be added to the above-mentioned bacterial culture media was a 2.7 w/v % of solution which was sterilized at 121° C. and then cooled to 5° C.

The incubates of the above bifidobacteria (hereinafter termed as B bacteria), the lactic acid bacteria (hereinafter termed as L bacteria) and the isolated soybean protein solution (hereinafter termed as SPI solution) were mixed together as shown in Table 5 (Examples 6 to 8 and Comparative Examples 1 to 3). A syrup was further added to the resulting mixture to give a total amount of 10 w/v % of the yogurt-like milk-fermented food. Such product was sealed and packed, and then preserved at not more than 10° C.

Figure 2:
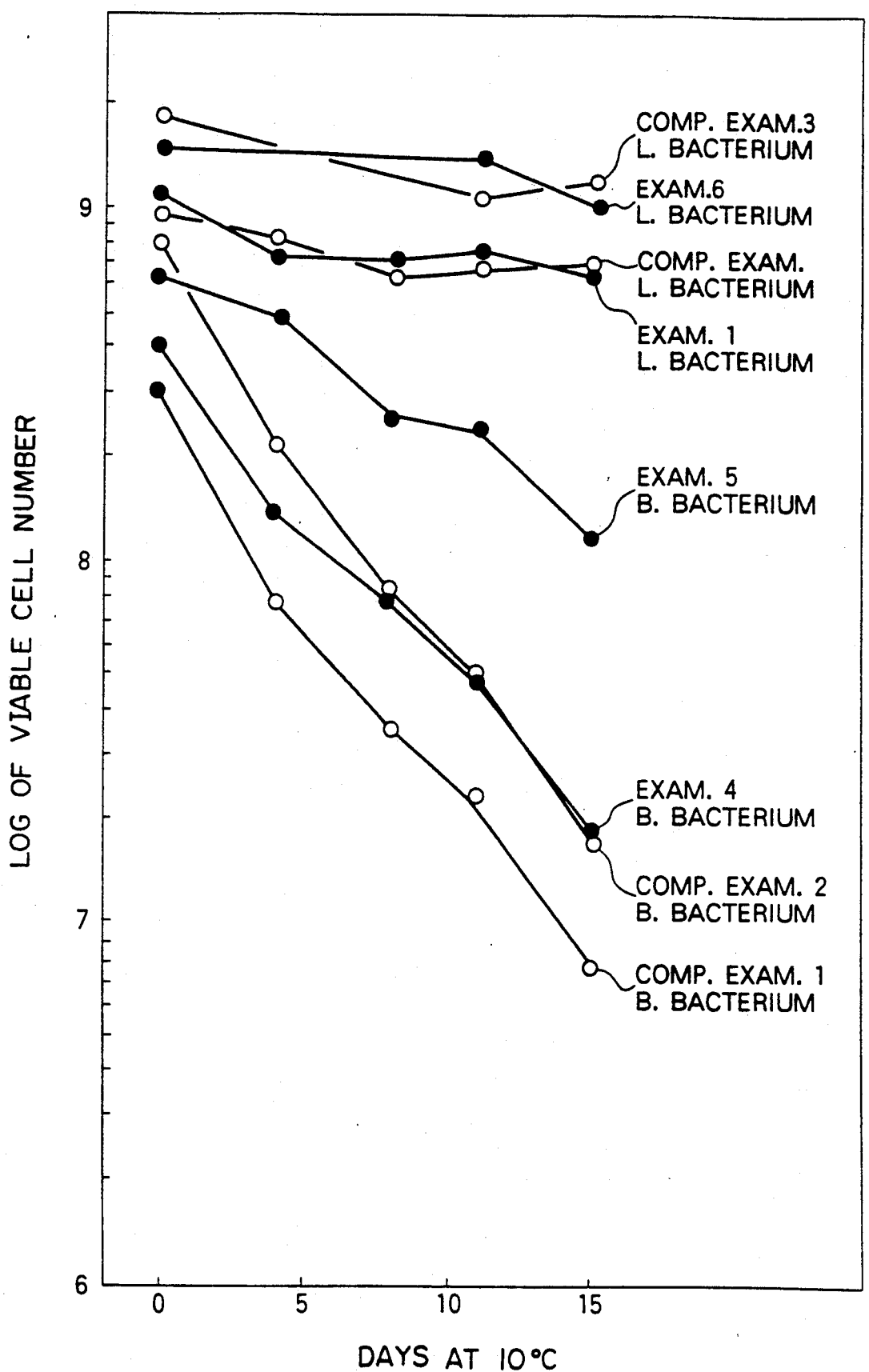
FIG. 2 is an illustration of a graph showing the time course of numbers of viable bacteria in products during storage at 10° C., respectively as in Examples 4 to 6 and Comparative Examples 1 to 3.

The results of the measurements of pH, acidity and change in the numbers of the viable bacteria in each product are shown in Table 6 and FIG. 2. It has been recognized that this table and figure show the improvements of buffering capacity of the product, and of survival rate of bacteria by the addition of the isolated soybean protein.

TABLE 5

|  | Composition | | |
| --- | --- | --- | --- |
|  | B bacterium culture | L bacterium culture | SPI solution |
| Comparative example 1 | 1.5 volume | 3 volume |  |
| Example 6 | 1.5 volume | 3 volume | 3.7 volume |
| Comparative example 2 | 4.5 volume |  |  |
| Example 7 | 4.5 volume |  | 3.7 volume |
| Comparative example 3 |  | 4.5 volume |  |
| Example 8 |  | 4.5 volume | 3.7 volume |

TABLE 6

|  | pH and acidity | | | |
| --- | --- | --- | --- | --- |
|  | 0 day production | | 15 days after production | |
|  | pH | Acidity | pH | Acidity |
| Comp. Exam. 1 | 4.34 | 9.20 | 4.34 | 9.57 |
| Example 6 | 4.49 | 9.50 | 4.34 | 10.87 |
| Comp. Exam. 2 | 4.48 | 5.18 | 4.47 | 5.45 |
| Example 7 | 4.68 | 5.40 | 4.66 | 5.71 |
| Comp. Exam. 3 | 4.32 | 11.26 | 4.31 | 11.63 |
| Example 8 | 4.44 | 11.46 | 4.38 | 12.12 |

When the flavor of the products was examined, there was a faint pleasant odor when isolated soybean protein was added but there was no unsavory soybean odor such as a fishy smell or pungency.

Example 9 and Comparative Examples 4 and 5

1 w/v % of a starter of Bifidobacterium breve YIT4010 prepared in a similar manner to Example 1 was inoculated into a culture medium which contained 13 w/v % of whole milk powder and 0.05 w/v % of yeast extract and cultured at 37° C. until the pH of the culture attained 4.50 (hereinafter the culture thus obtained is termed as A).

0.5 w/v of a starter of Streptococcus thermophilus YIT2021 prepared in a manner similar to Example 1 was inoculated into a culture medium which contained 7.5 w/v % of whole milk powder, 21 w/v % of skim powder milk and 0.1 w/v % of yeast extract, and then was cultured at 37° C. until the pH of the inoculate attained 4.50 (hereinafter the culture thus obtained is termed as B).

1.5 volumes of culture A, 3.0 volumes of culture B and 3.7 volumes of isolated soybean protein solution (that was commercially available and was solubilized in water to become 2.68 w/v %, then was sterilized) were mixed together, and pectin and syrup were added to such mixture to give a total amount of 10 volumes of yogurt (Example 9).

1.5 volumes of culture A, 3.0 volumes of culture B and 2.0 volumes of soybean milk (made of soybean in the conventional way and sterilized; 5% soybean protein content) were mixed together, and pectin and sterilized water were added to such mixture to such mixture to give a total amount of 10 volumes of yogurt (Comparative Example 4).

The content of soybean protein in Example 9 and Comparative Example 4 were both 1.0 w/v %.

Further, 1.5 volumes of culture A and 3.0 volumes of culture B were mixed together, and pectin, syrup and sterilized water were added to such mixture to give a total amount of 10 volumes of yogurt without addition of isolated soybean protein (Comparative Example 5). This yogurt was subjected a sensory test as a standard product.

The results of the sensory test on soybean odor (fishy smell) and taste were examined by 10 well-trained panelists are illustrated in Table 7. As can be seen from Table 7, this isolated soybean protein had almost no characteristic soybean odor or pungency. Evaluation standards were as follows:

| 1. Soybean odor | |
|---|---|
| 0: | None |
| 1: | Slight |
| 2: | Ordinary |
| 3: | Fairly |
| 4: | High |
| 2. Taste | |
| +2: | Quite tasty |
| +1: | Tasty |
| 0: | Ordinary |
| −1: | Unsavory |
| −2: | Quite unsavory |

In the product in Example 9, it was stated by the panelists that the product become tasty by the very weak and slight soybean flavor.

| | Soybean odor | | Taste | |
|---|---|---|---|---|
| | $\bar{X} \pm D$ | Significant difference | $\bar{X} \pm D$ | Significant difference |
| Exam. 9 Isolated soybean protein added product | 0.8 ± 0.23 | | 1.2 ± 0.37 | |
| Comp. Exam. 4 soybean milk added product | 3.2 ± 0.35 | * | −0.8 ± 0.23 | * |
| Comp. Exam. 5 Plain yogurt | 0.5 ± 0.23 | | 1.4 ± 0.35 | |

FIG. 7 (*Significant difference when risk ratio is 5%)

What is claimed is:

1. A method of producing milk-fermented food, consisting essentially of
   inoculating and culturing in milk a bifidobacteria or a lactic acid bacteria or a combination of said two bacteria, said milk having added thereto from 0.1 w/v % to 5.0 w/v % of an isolated soybean protein with respect to said milk, wherein the culturing period is shortened and the number and survival rate of live bacteria is increased, providing a milk fermented food with fresh flavor based on high acidity.

2. A method of producing milk-fermented food as claimed in claim 1, wherein a yeast extract is added together with said isolated protein to said milk.

3. A method of producing milk-fermented food as claimed in claim 2, wherein 0.01 w/v % to 0.1 w/v % of said yeast extract is added to said milk.

4. A method of producing milk-fermented food as claimed in any one of claims 2-3, wherein said bifidobacterium is one or more species of bacteria selected from the group consisting of Bifidobacterium breve, Bifidobacterium longum, Bifidobacterium bifidum, and Bifidobacterium infantis.

5. A method of producing milk-fermented food, consisting essentially of
   inoculating and culturing in milk a bifidobacteria or a lactic acid bacteria or a combination of said two bacteria, and then
   adding to said culture from 0.1 w/v % to 1.5 w/v % of an isolated soybean protein with respect to a culture obtained by the cultivation of said bacteria, wherein the culturing period is shortened and the number and survival rate of live bacteria is increased, providing a milk fermented food with fresh flavor based on high acidity.

6. A method of producing milk-fermented food as claimed in claim 5, wherein 0.1 w/v % to 1.0 w/v % of said isolated soybean protein is added to said culture.

7. A method of producing milk-fermented food as claimed in claim 5, wherein said bifidobacterium is one or more species of bacteria selected from the group consisting of Bifidobacterium breve, Bifidobacterium longum, Bifidobacterium bifidum and Bifidobacterium infantis.

* * * * *